United States Patent
Sonderegger et al.

(10) Patent No.: US 7,926,054 B2
(45) Date of Patent: Apr. 12, 2011

(54) SYSTEM, METHOD, AND COMPUTER-READABLE MEDIUM FOR VIRTUAL MACHINE INSTANTIATION FROM AN EXTERNAL PERIPHERAL DEVICE

(75) Inventors: Kelly Sonderegger, Santaquin, UT (US); Ryan Partridge, Provo, UT (US)

(73) Assignee: Novell, Inc., Provo, UT (US)

( * ) Notice: Subject to any disclaimer, the term of this patent is extended or adjusted under 35 U.S.C. 154(b) by 1440 days.

(21) Appl. No.: 11/368,195

(22) Filed: Mar. 3, 2006

(65) Prior Publication Data
US 2007/0209035 A1   Sep. 6, 2007

(51) Int. Cl.
G06F 9/455 (2006.01)
G06F 9/46 (2006.01)

(52) U.S. Cl. .......................................... 718/1; 718/104

(58) Field of Classification Search .................. 718/100, 718/1; 719/319
See application file for complete search history.

(56) References Cited

U.S. PATENT DOCUMENTS

| 7,340,748 | B2 * | 3/2008 | Vandewalle et al. | 719/330 |
| 2002/0013802 | A1 * | 1/2002 | Mori et al. | 709/1 |
| 2004/0128670 | A1 * | 7/2004 | Robinson et al. | 718/1 |
| 2004/0172629 | A1 * | 9/2004 | Tene et al. | 718/1 |
| 2006/0047604 | A1 * | 3/2006 | Kraft-Oz et al. | 705/59 |
| 2006/0070085 | A1 * | 3/2006 | Bao et al. | 719/319 |
| 2006/0080522 | A1 * | 4/2006 | Button et al. | 713/2 |
| 2006/0136720 | A1 * | 6/2006 | Armstrong et al. | 713/164 |
| 2006/0161719 | A1 * | 7/2006 | Bennett et al. | 711/6 |
| 2007/0113228 | A1 * | 5/2007 | Raghunath et al. | 718/1 |
| 2008/0010649 | A1 * | 1/2008 | Grimaud et al. | 719/332 |
| 2009/0172820 | A1 * | 7/2009 | Watson | 726/26 |

OTHER PUBLICATIONS

European Search Report for European Patent Application No. 07103013.4 dated Dec. 12, 2007.
The Xen Team: "Xen User's Manual" Xen User's Manual, Xen Team University of Cambridge, Cambridge, GB, Aug. 9, 2004, pp. 1-50.
Zeuthen, David: "Desktop and Hardware Configuration", Redhat Magazine, Jan. 2005, pp. 1-14.

* cited by examiner

Primary Examiner — Meng-Ai An
Assistant Examiner — Tammy Lee
(74) Attorney, Agent, or Firm — Hayes and Boone, LLP

(57) ABSTRACT

A system, method, and computer-readable medium for instantiating a virtual machine on a computer by way of a physical peripheral device is provided. A virtual machine image may be composed on a portable memory device, such as a USB-flash memory device. Insertion of the physical device in a peripheral terminal is detected by a host function or module, and the physical device is evaluated to determine whether a virtual machine is defined thereby. In the event that the physical device includes a virtual machine image, the host reads the virtual machine image from the physical device and allocates a virtual machine per the read virtual machine image.

18 Claims, 6 Drawing Sheets

SYSTEM, METHOD, AND COMPUTER-READABLE MEDIUM FOR VIRTUAL MACHINE INSTANTIATION FROM AN EXTERNAL PERIPHERAL DEVICE

BACKGROUND

Continued advances in semiconductor miniaturization technologies have resulted in various commercially viable portable products. For example, universal serial bus (USB) flash drives provide portable storage capacities of 1 GB or more for use with USB-equipped personal computers. Various media storage devices, such as Memory Stick, CompactFlash, Secure Digital, MultiMediaCard, and Microdrive flash memories, are available for extending the capacities of any of a number of multimedia devices, such as digital photography equipment, gaming systems, audio players, and the like.

The portable computing marketplace has evolved from the variety of portable devices available for use with personal computing technologies. One example of a popular portable computing device is the Computer-On-a-Stick™ (COS) produced by Bionopoly LLC of Mountain View, Calif. The COS is a USB Flash Drive that features an onboard Operating System, a Microsoft Office™-compatible suite, PDF™ Creator, and various other computing applications including web browser, email and messaging utilities. In operation, the COS is booted from the host USB drive thereby bypassing the host operating system.

As portable media and computational devices become more common, computing environments that may host such devices have a corresponding increase in computational resources or capabilities that may be added, removed, and interchanged with other systems. When a variety of portable computing devices are periodically added or removed from a computing system, the host desktop is necessarily modified with the addition or removal of such devices. In such a situation, efficient allocation of system resources to computing entities is complicated by the fact that the available computing devices are dynamic by nature due to the portability of such devices. As the complexity of computing system infrastructure continues to increase, the efficient allocation of system resources to computing system devices becomes increasingly difficult.

BRIEF DESCRIPTION OF THE DRAWINGS

Aspects of the present disclosure are best understood from the following detailed description when read with the accompanying figures, in which.

DETAILED DESCRIPTION

Figure 1:
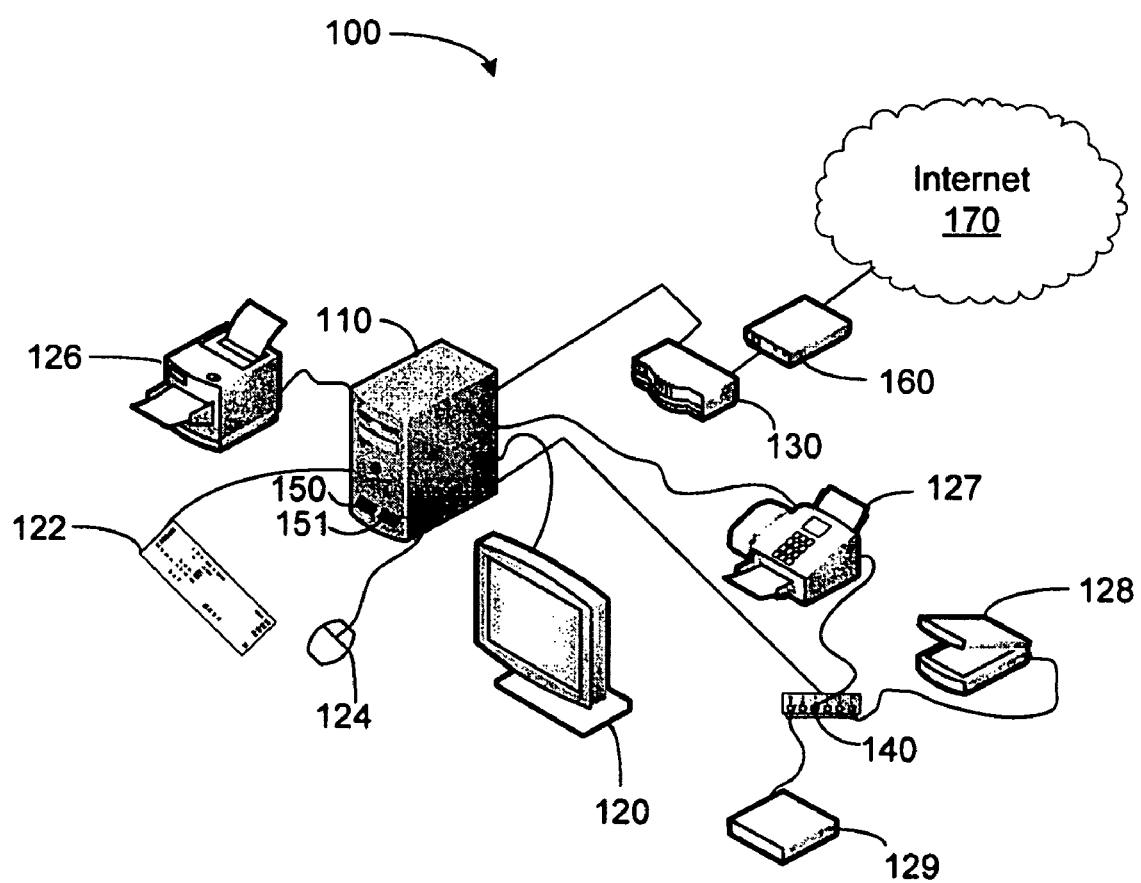
FIG. 1 is a diagrammatic representation of an embodiment of a computer system in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an embodiment of a system 100 in which embodiments disclosed herein may be implemented. Exemplary system 100 is implemented as a small system of devices such as may be found in a small office or home office computing environment. System 100 may include one or more computers 110, such as a personal computer (PC), that is interconnected with any number of input/output devices. In the illustrative example, PC 110 is connected with a display monitor 120, e.g., by way of an RGB cable coupling monitor 120 with an RGB terminal of PC 110. A keyboard 122 may be connected with PC 110, e.g., by a cable coupling keyboard 122 with a PS/2 terminal of PC 110. A pointer device 124 may be connected with PC 110 by, for example, a cable coupling pointer device 124 with a serial terminal, a PS/2 terminal, a USB terminal, or another suitable interface of PC 110. A printer 126 may be connected with PC 110, e.g., by way of a cable coupling printer 126 with a parallel terminal, USB terminal, or another suitable interface of PC 110.

System 100 may include a router, such as a switchable router 130, that connects system 100 with other networks, such as Internet 170 by way of a modem 160, e.g., a DSL modem, cable modem, or the like, over an RJ-11 or other interface. In the illustrative example, router 130 is implemented as a multiple port switchable router, and thus system 100 may include multiple PCs that may share a single physical connection with Internet 170. PC 110 is connected with router 130 via a suitable networking cable, e.g., Cat 5 cable. Alternatively, router 130 may be implemented as a wireless router and PC 110 may be equipped with a wireless network interface card (NIC). Accordingly, PC 110 may couple with router 130 over a wireless interface.

In the illustrative example, PC 110 may include one or more external peripheral interfaces, such as USB terminals 150 and 151 for connection of external peripheral devices. For example, a USB hub 140 may connect with a USB terminal (not shown) of PC 110 to provide for connection of multiple USB devices. In the illustrative example, a USB-compliant facsimile machine 127, scanner 128, and external hard drive 129 are connected with hub 140. In accordance with embodiments disclosed herein, one or more USB physical devices may be coupled with a respective USB terminal for instantiation of a virtual machine on host PC 110.

Figure 2:
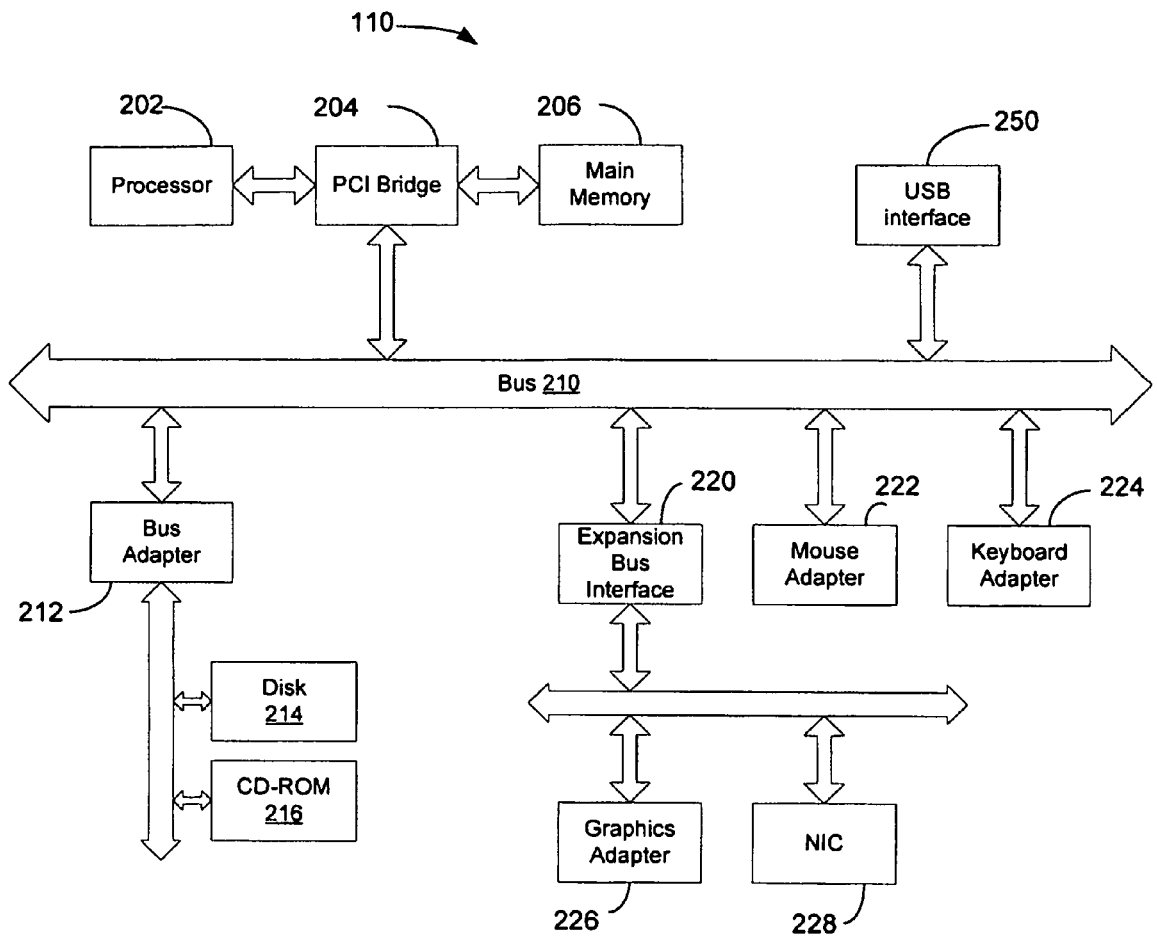
FIG. 2 is a block diagram of an embodiment of computer system on which a virtual machine may be instantiated via a physical peripheral device.

FIG. 2 is a block diagram of an embodiment of computer 110 on which a virtual machine may be instantiated via an external peripheral device. Code or instructions implementing the processes of embodiments disclosed herein may be located or accessed by computer 110. In the illustrative example, computer 110 employs a peripheral component interconnect (PCI) local bus architecture, although other bus architectures, such as the Industry Standard Architecture (ISA), may be used. A processor system 202 and a main memory 206 are connected to a PCI local bus 210 through a PCI bridge 204. PCI bridge 204 also may include an integrated memory controller and cache memory for processor system 202. Additional connections to PCI local bus 210 may be made through direct component interconnection or through add-in connectors. In the depicted example, a small computer system interface (SCSI) host bus adapter 212, an expansion bus interface 220, a mouse adapter 222, a keyboard adapter 224, and a USB interface 250 are connected to PCI local bus 210 by direct component connection. In contrast, a graphics adapter 226 and network interface card (NIC) 228 are connected to PCI local bus 210 via expansion bus interface 220 by add-in boards inserted into expansion slots. NIC 228 provides an interface for connecting computer 110 with router 130 depicted in FIG. 1. Expansion bus interface 220 provides a connection for various peripheral devices. SCSI host bus adapter 212 provides a connection for a hard disk drive 214, and CD-ROM drive 216. Typical PCI local bus implementations may support a plurality of PCI expansion slots or add-in connectors.

An operating system runs on processor system 202 and is used to coordinate and provide control of various components within computer 110. Instructions for the operating system and applications or programs are located on storage devices, such as hard disk drive 214, and may be loaded into main memory 206 for execution by processor system 202.

FIGS. 1 and 2 are intended as examples, and not as architectural limitations, of a system and computer in which embodiments disclosed herein may be implemented. The particular system and computer architectures shown and described are illustrative and are chosen only to facilitate an understanding of the disclosed embodiments. The processes of embodiments disclosed herein may be performed by processor system 202 using computer implemented instructions tangibly embodied on a computer-readable medium.

In broad terms, virtualization is an abstraction mechanism that decouples hardware from an operating system. A virtual machine, as referred to herein, comprises an execution environment on a single computer that emulates the host computer. The virtual machine may include an operating system instance and any number of applications running on the operating system instance. Multiple virtual machines may be instantiated on a single host computer that each run in isolation, that is unaware, of the other virtual machines. A virtual machine may have one or more system resource partitions allocated thereto. For example, a virtual machine may have a memory space partition that is dedicated to the virtual machine. The memory space partition comprises a subset of the host system's complete memory space. In a similar manner, other system resources may be partitioned and allocated to a virtual machine.

In accordance with embodiments disclosed herein, a virtual machine is instantiated from an image maintained on a peripheral device, such as a USB flash memory. In particular, a host operating system is adapted to detect an insertion event of a USB flash memory or other peripheral device and, in response to the insertion event, read a virtual machine image from the peripheral device. The image is then instantiated in the host's memory and the virtual machine is configured for operation.

Figure 3:
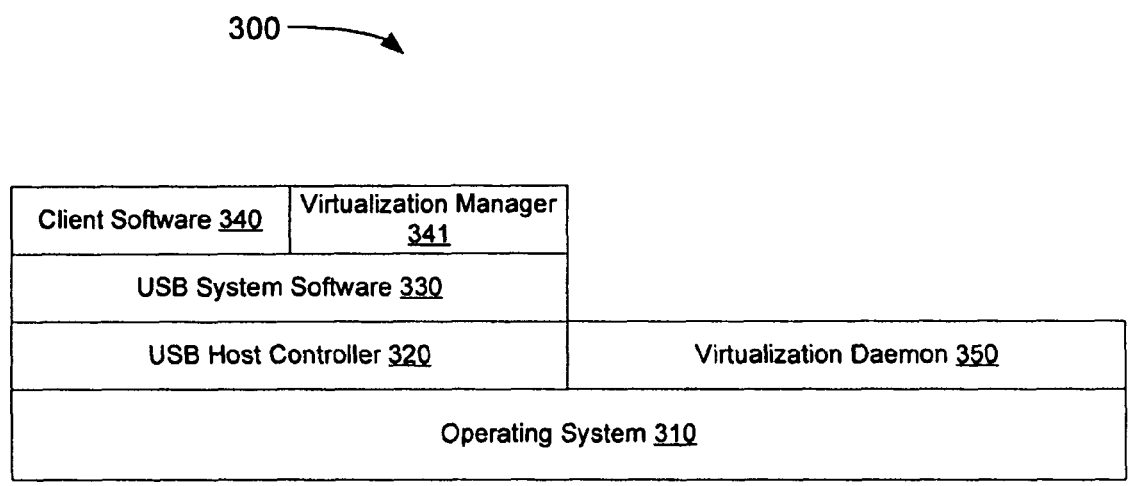
FIG. 3 is a diagrammatic representation of an embodiment of a configuration of a host computer system that facilitates automated virtual machine instantiation.

FIG. 3 is a diagrammatic representation of an embodiment of a configuration 300 of a host computer system (also referred to herein simply as "host") that facilitates automated virtual machine instantiation. Host configuration 300 includes an operating system 310 on which a host controller 320 is run. Host controller 320 includes logic for detecting attachment and removal of USB devices to host computer 110, managing control flow between the host and attached devices, collecting status and activity data, and the like, that provides the host with the requisite functionality for providing a host side bus interface. It is understood that functionality of host controller 320 may be implemented in a combination of software and hardware. USB system software 330 provides functionality for supporting the USB in accordance with the particular host configuration, e.g., in accordance with the particular host operating system 310. USB system software 330 may include a USB driver, host controller driver, and host software. Client software 340 comprises software that interacts with system software 330, e.g., for originating or consuming transferred data to/from a USB physical device.

Host configuration 300 may include a virtualization manager 341 that facilitates instantiation of a virtual machine from a USB physical device. In accordance with an embodiment, virtualization manager 341 receives virtual machine image data from a USB physical device and allocates a virtual machine according to the image data obtained from the physical device. Additionally, virtualization manager 341 may coordinate partitioning of system resources and the allocation of partitioned resources to a virtual machine.

Configuration 300 may include a virtualization daemon 350 that listens for a USB "plugin" event, that is the occurrence of insertion or attachment of a USB physical device in a USB terminal. On detection of a plugin event, daemon 350 may evaluate the USB physical device to determine if the physical device is configured for instantiation of a virtual machine. While daemon 350 is shown as a distinct entity in configuration 300, daemon 350 may be integrated, in whole or in part, with USB host controller 320 or may operate in conjunction therewith.

Figure 4:
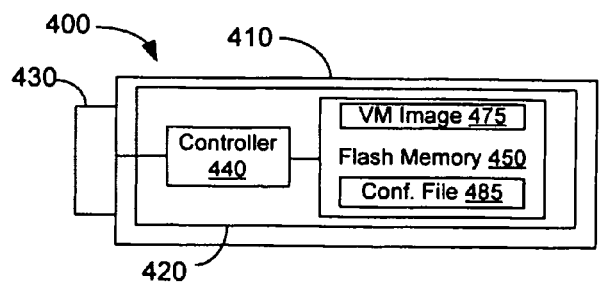
FIG. 4 is a diagrammatic representation of an embodiment of a physical device that may maintain virtual machine image data for instantiation on a host computer system.

FIG. 4 is a diagrammatic representation of an embodiment of a physical device 400 that may maintain virtual machine image data for instantiation on host computer 110. Physical device 400 may include a protective casing 410 in which a printed circuit board 420 is disposed. A USB interface 430 may be exposed at a distal end of casing 410. A USB controller 440 is deployed on circuit board 420 and is coupled with USB interface 430. Controller 440 comprises requisite logic for communicating with host controller 320 of the host configuration depicted in FIG. 3. Controller 440 may be implemented as an integrated circuit and may include a microprocessor, memory, e.g., read-only and/or random access memory, and associated circuitry. A flash memory 450 implemented as an integrated circuit disposed on circuit board 420 maintains data. In accordance with an embodiment, a virtual machine image 475 is stored on flash memory 450 and may include, for example, a data structure defining an operating system and any number of applications adapted for running on the operating system. A configuration file 485 may also be stored on flash memory 450 that defines how a virtual machine specified by virtual machine image 475 is to be configured.

Figure 5:
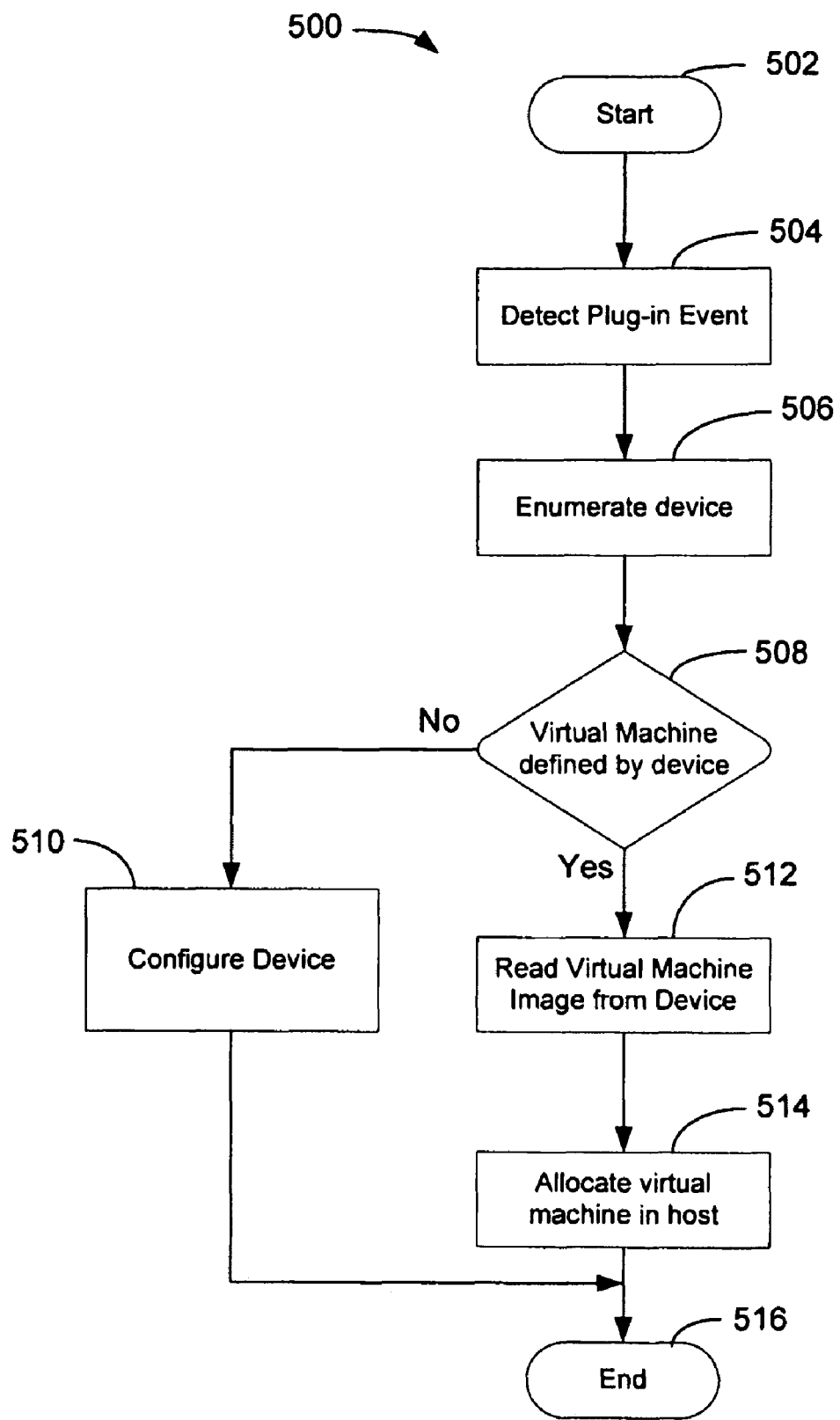
FIG. 5 is a flowchart depicting an embodiment of a host processing routine that facilitates automated virtual machine instantiation.

FIG. 5 is a flowchart depicting an embodiment of a host processing routine that facilitates automated virtual machine instantiation. The host processing routine is invoked (step 502), e.g., on boot-up by execution of one or more system software layers, applications, and/or background processes such as daemon 350. The host processing routine then awaits detection of a plugin event (step 504). The host may then proceed to enumerate the physical device (step 506). An evaluation may then be made to determine if the inserted physical device defines or otherwise specifies a virtual machine (step 508). In accordance with an embodiment, daemon 350 may evaluate a particular location of the physical device for an indicator that the device specifies a virtual machine. For example, data that indicates the device includes a virtual machine image may be specified in a configuration file maintained on flash memory 450. Accordingly, identification of configuration file 485 may be interpreted as the existence of a virtual machine image on physical device 400. The configuration data may be contained in a distinct configuration file, e.g., configuration file 485, or may be maintained with other configuration data of the device. For example, the configuration data that identifies the physical device as maintaining data defining a virtual machine may be maintained in device or configuration descriptors stored onboard the physical device.

In the event that it is determined that the physical device does not define a virtual machine, the host processing routine may proceed to configure the device in accordance with USB configuration procedures (step 510). The host processing routine cycle may then end (step 516).

Returning again to step 508, in the event that it is determined that the physical device defines a virtual machine, the host processing routine may then read the virtual machine image from the physical device (step 512). A virtual machine is then allocated in the host per the virtual machine image read from the physical device (step 514). For example, assume that host operating system 310 is implemented as Unix, or a variant thereof, and virtualization manager 341 is implemented as a Xen virtual machine monitor. In this configuration, virtualization manager 341 may be configured to run an xm create command that specifies configuration file 485 for creation of a virtual machine. The host processing routine cycle may then end according to step 516.

The processing sequence described in FIG. 5 is provided for illustrative purposes only and is not intended to denote serialization of the described processing steps. In various embodiments, the processing steps described in FIG. 5 may be performed in varying order and may be performed in parallel with other depicted processing steps.

Figure 6A:
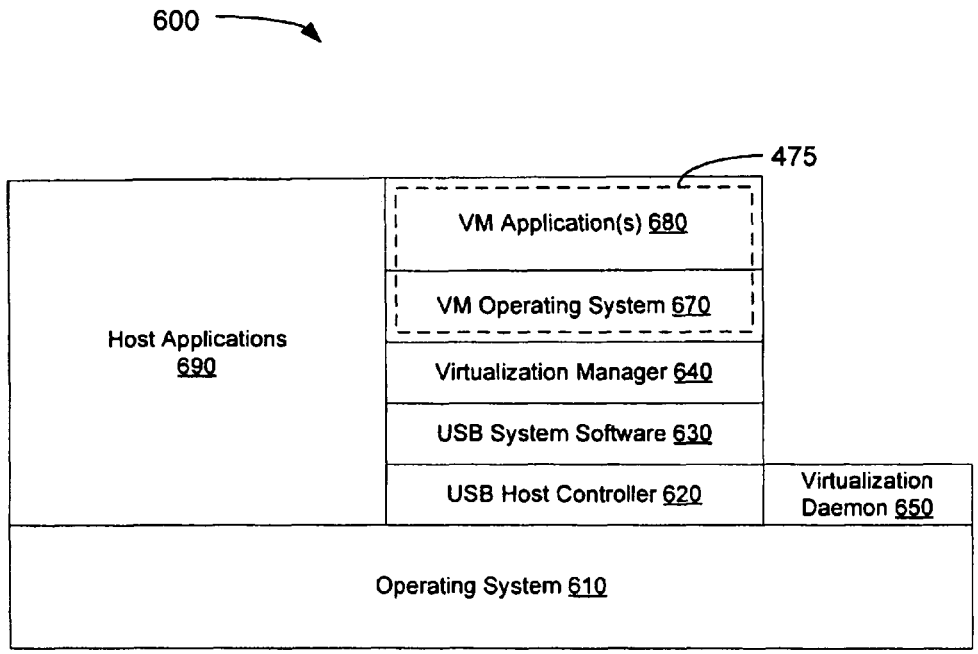
FIGS. 6A-6B are diagrammatic representations of embodiments of a host configuration after instantiation of a virtual machine from a physical device.

FIG. 6A is a diagrammatic representation of an embodiment of a host configuration 600 after instantiation of a virtual machine from a physical device. Host configuration 600 is representative of a software and/or hardware configuration of a USB host device, such as computer 110 shown in FIG. 1. Host configuration 600 includes a host operating system 610 on which a host controller 620 is run. Host controller 620 includes logic for detecting attachment and removal of USB devices to host computer 110, managing control flows between the host and attached devices, collecting status and activity data, and the like, and provides the host with the requisite functionality for providing a host side bus interface. Host controller 620 may be implemented in a combination of software and hardware. USB system software 630 provides functionality for supporting the USB in accordance with the particular host configuration, e.g., in accordance with operating system 610. USB system software 630 may include a USB driver, host controller driver, and host software. Client software includes a virtualization manager 640 that facilitates instantiation of a virtual machine from a USB physical device. In accordance with an embodiment, virtualization manager 640 invokes a virtual machine instantiation routine in response to daemon 650 detecting a plugin event and confirming the newly inserted USB device includes a virtual machine image. To this end, virtualization manager 640 reads the virtual machine image 475 from USB physical device 400 and allocates the virtual machine on host computer 110 in response to attachment of physical device 400 with a USB terminal of host computer 110. For example, virtualization manager 640 may allocate a portion of the host's address space to the virtual machine and allocate the virtual machine thereto. In the illustrative example, the virtual machine image 475 read from USB physical device 400 includes an operating system 670 instance and one or more applications 680. Virtualization manager 640, in response to reading virtual machine image 475, writes the virtual machine image including the virtual machine operating system 670 and one or more virtual machine applications 680 to a portion of the host memory allocated to virtual machine 475. Host resources allocated to virtual machine 475 are partitioned from other system resources thereby allowing virtual machine 475 to run in isolation from other system applications, such as host applications 690, and/or other virtual machines.

Figure 6B:
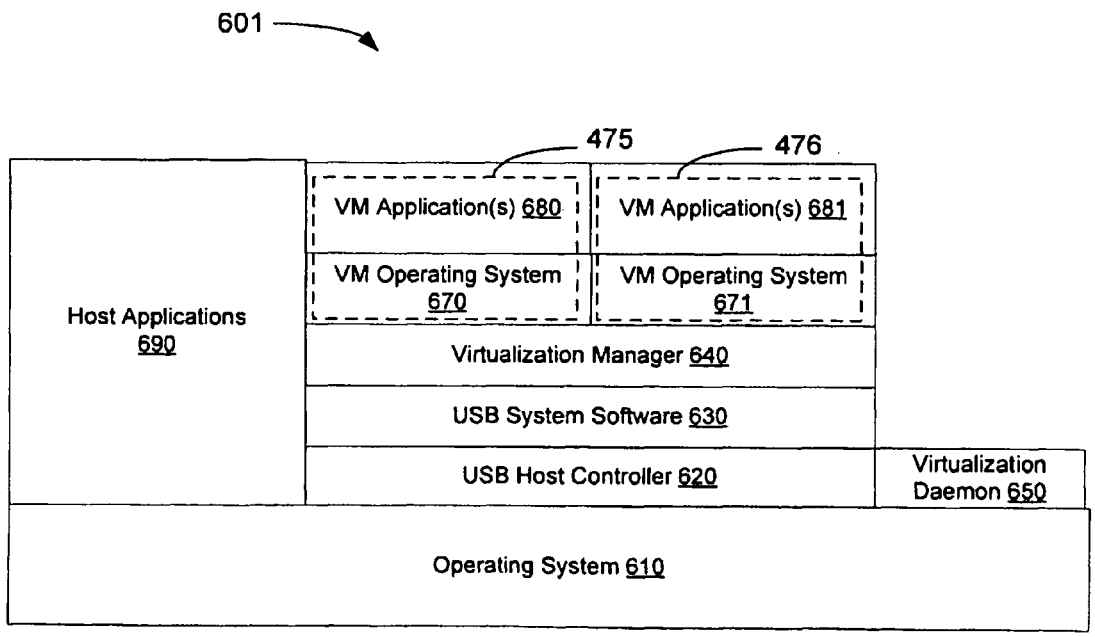

In a similar manner, daemon 650 may monitor for additional USB plugin events. If another USB plugin event is detected, daemon 650 may evaluate whether a newly inserted USB physical device defines a virtual machine. The procedures described above may then be repeated for instantiation of another virtual machine on the host computer system as illustrated by host configuration 601 that includes another virtual machine 476 including a virtual machine operating system 671 and one or more virtual machine applications 681 as shown in FIG. 6B. Virtual machines 475 and 476 are each allocated in separate partitions and run in isolation from one another.

Figure 7:
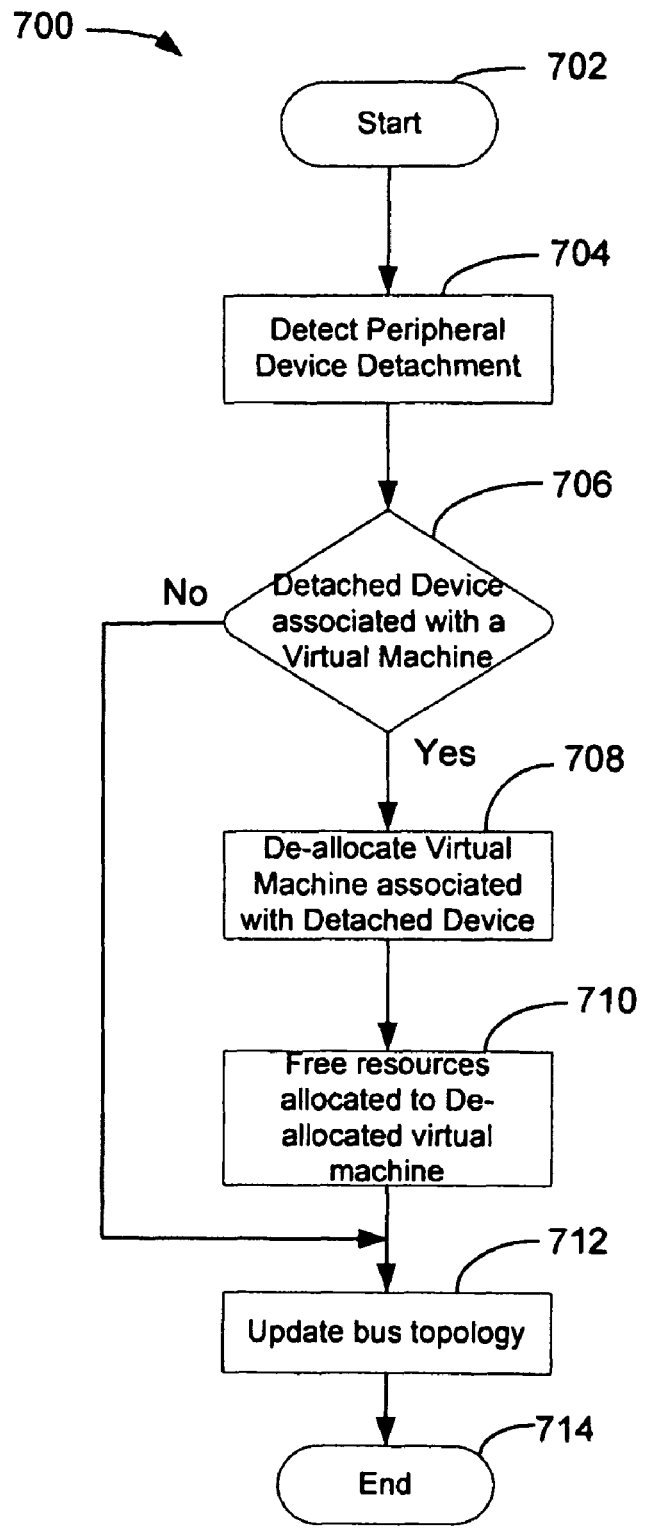
FIG. 7 is a flowchart depicting an embodiment of a host processing routine that facilitates de-allocation of a virtual machine in response to detachment of a peripheral device.

FIG. 7 is a flowchart 700 depicting an embodiment of a host processing routine that facilitates virtual machine de-allocation in response to detachment of a peripheral device. The host processing routine is invoked (step 702), e.g., on boot-up by execution of one or more system software layers, applications, and/or background processes such as daemon 650. The host processing routine then awaits detection of a detachment, or removal, event (step 704). An evaluation is then made to determine if the detached device is associated with a virtual machine (step 706). In the event the detached device is not associated with a virtual machine, the host processing routine may proceed to update the bus topology (step 712).

Returning again to step 706, in the event that the detached device is associated with a virtual machine, the host may then de-allocate the virtual machine associated with the detached device (step 708). For example, virtualization manager 640 may call the xm destroy command and specify the configuration file associated with the particular virtual machine. Virtualization manager 640 may then proceed to free system resources previously allocated to the newly de-allocated virtual machine (step 710). The host processing routine may then update the bus topology according to step 712. The host processing routine cycle may end after the bus topology is updated to indicate removal of the detached device (step 714).

The processing sequence described in FIG. 7 is provided for illustrative purposes only and is not intended to denote serialization of the described processing steps. In various embodiments, the processing steps described in FIG. 7 may be performed in varying order and may be performed in parallel with other depicted processing steps.

As described, embodiments disclosed herein provide mechanisms for instantiating a virtual machine on a computer by way of a physical peripheral device. A virtual machine image may be composed on a portable memory device, such as a USB-flash memory device. Insertion of the physical device in a peripheral terminal is detected by a host function or module, and the physical device is evaluated to determine whether a virtual machine is defined thereby. In the event that the physical device includes a virtual machine image, the host reads the virtual machine image from the physical device and allocates a virtual machine per the read virtual machine image.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A method of instantiating a virtual machine, comprising:
    detecting attachment of a physical peripheral device to a peripheral terminal;
    evaluating the physical peripheral device to determine if a virtual machine image is composed thereon;
    responsive to determining the physical peripheral device has the virtual machine image composed thereon, reading the virtual machine image from the physical peripheral device; and
    instantiating a first virtual machine according to the virtual machine image,
    wherein the instantiating includes allocating an instance of an operating system and one or more applications each defined by the virtual machine image.

2. The method of claim 1, further comprising allocating resources to the first virtual machine.

3. The method of claim 1, wherein detecting attachment further comprises detecting attachment of a universal serial bus physical peripheral device.

4. A device that facilitates instantiation of a virtual machine, comprising:
    a peripheral bus interface through which the device is coupled to an external host device, wherein attachment of the device is detected by the external host device;
    a peripheral bus controller that facilitates communication with the external host device; and
    a memory having an image of a virtual machine composed thereon, wherein the external host device is adapted to read the image of the virtual machine from the memory, wherein the image of the virtual machine is different from the virtual machine itself and is operable to be used to instantiate the virtual machine in the external host device by allocating an instance of an operating system and one or more applications each defined by the image of the virtual machine.

5. The device according to claim 4, wherein the peripheral bus interface comprises a universal serial bus interface, and wherein the peripheral bus controller comprises a universal serial bus controller.

6. An apparatus comprising a non-transitory, tangible computer-readable storage medium storing computer-executable instructions for execution by a processing system, the computer-executable instructions for instantiating a virtual machine and include:
    instructions that detect attachment of a physical peripheral device to a peripheral terminal;
    instructions that evaluate the physical peripheral device to determine if a virtual machine image is composed thereon;
    instructions that, responsive to a determination that the physical peripheral device has the virtual machine image composed thereon, read the virtual machine image from the physical peripheral device; and
    instructions that instantiate a first virtual machine according to the virtual machine image, wherein the instructions that instantiate further include instructions that allocate an instance of an operating system and one or more applications each defined by the virtual machine image.

7. The apparatus according to claim 6, wherein the computer-readable storage medium stores further instructions that allocate resources to the first virtual machine.

8. The apparatus of claim 6, wherein the instructions that detect attachment further include instructions that detect attachment of a universal serial bus physical peripheral device.

9. A computer system, comprising:
    a memory system having a first operating system and a virtualization manager running thereon;
    a processor system coupled with the memory system; and
    a peripheral bus system adapted for attachment of one or more peripheral devices, wherein the virtualization manager is adapted to, in response to attachment of a physical peripheral device to the peripheral bus system, read a virtual machine image from the physical peripheral device and instantiate a first virtual machine in the memory system according to the virtual machine image.

10. The system of claim 9, wherein the first virtual machine comprises an operating system instance and one or more applications defined by the virtual machine image.

11. The system of claim 9, wherein the peripheral bus system comprises a universal serial bus, and wherein the physical peripheral device comprises a universal serial bus physical device.

12. The system of claim 9, further comprising a virtualization daemon allocated in the memory system that is adapted to detect attachment of the physical peripheral device to the peripheral bus system.

13. The system of claim 12, wherein the virtualization daemon, in response to detecting attachment of the physical peripheral device, evaluates the physical peripheral device for inclusion of the virtual machine image.

14. The system of claim 9, wherein the physical peripheral device comprises a universal serial bus flash memory device.

15. The system of claim 9, wherein the one or more peripheral devices comprise a plurality of peripheral devices each having a respective virtual machine image composed thereon, and wherein the virtualization manager is adapted to instantiate a virtual machine in the memory system for each respective virtual machine image.

16. The method of claim 1, wherein the instantiating is carried out in a manner so that the first virtual machine is instantiated in a host device that is different from the physical peripheral device; and wherein the virtual machine image is different from the first virtual machine.

17. The device of claim 4, wherein the device is a portable device.

18. The apparatus of claim 6, wherein the instructions that instantiate the first virtual machine include instructions that instantiate the first virtual machine in a host device that is different from the physical peripheral device, and wherein the first virtual machine is different from the virtual machine image.

* * * * *